(No Model.)
H. P. DREW.
GAS AND LAMP BRACKET.
No. 300,584.  Patented June 17, 1884.
2 Sheets—Sheet 1.
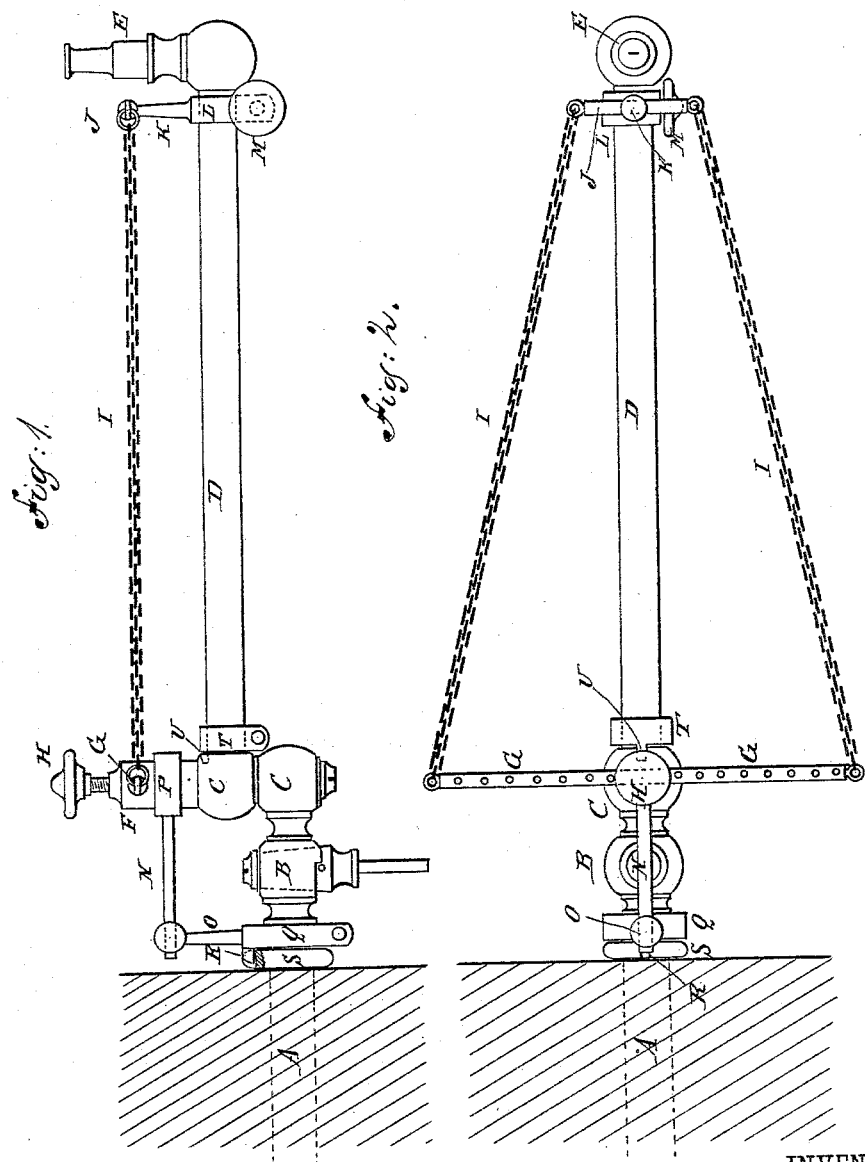
WITNESSES:
Chas. Nidu
C. Sedgwick
INVENTOR:
H. P. Drew
BY Munn & Co.
ATTORNEYS.

(No Model.) 2 Sheets—Sheet 2.
H. P. DREW.
GAS AND LAMP BRACKET.
No. 300,584. Patented June 17, 1884.
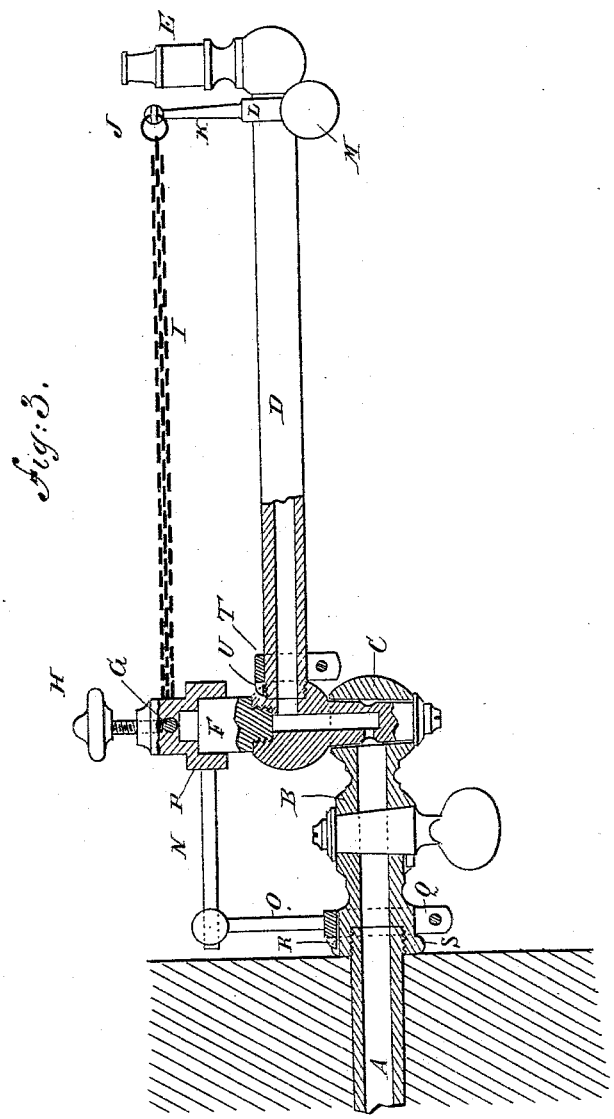
WITNESSES:
Chas. Niela
C. Sedgwick
INVENTOR:
H. P. Drew
BY Munn & Co.
ATTORNEYS.

UNITED STATES PATENT OFFICE.

HENRY PHILIP DREW, OF NEW YORK, N. Y.

GAS AND LAMP BRACKET.

SPECIFICATION forming part of Letters Patent No. 300,584, dated June 17, 1884.

Application filed January 3, 1884. (No model.)

*To all whom it may concern:*

Be it known that I, HENRY PHILIP DREW, of the city, county, and State of New York, have invented a new and useful Improvement in One-Jointed Gas and Lamp Brackets, of which the following is a full, clear, and exact description.

Reference is to be had to the accompanying drawings, forming a part of this specification, in which similar letters of reference indicate corresponding parts in all the figures.

Figure 1, Sheet 1, is a side elevation of my improvement. Fig. 2, Sheet 1, is a plan view of the same; and Fig. 3, Sheet 2, is a side elevation of my improvement, partly in section.

The object of this invention is to promote security against fire in the use of one-jointed gas or lamp brackets.

The invention consists in a one-jointed gas or lamp bracket constructed with an adjustable cross-bar connected with the joint, and connected by two chains with a short cross-bar secured adjustably to the outer part of the pipe by a post and clip, whereby the said pipe can be held rigid or allowed to have any desired amount of swing in either direction, as will be hereinafter fully described.

I will describe my improvement as applied to gas-brackets, but do not limit myself to that use, as it can be applied with equal facility and advantage to lamp-brackets.

A represents a gas-pipe, which is provided with a cock, B, and is connected by a joint, C, with the inner end of a pipe, D, having a burner, E, attached to its outer end. The pivot of the joint C is extended upward to form a post, F, or has a post, F, attached to it, upon which is placed a loose cap, P, having a cross perforation in its upper end to receive a sliding cross-bar, G. The cross-bar G is secured in place when adjusted by a set-screw, H, passing down through a screw-hole in the top of the cap P.

To the ends of the cross-bar G are attached the ends of two chains, I, the other ends of which are attached to the ends of a short cross-bar, J, attached to the upper end of a short post, K. The post K is secured to the pipe D by a clip, L, and clamping-screw M, so that the said clip can be readily loosened to allow the post K and cross-bar J to be adjusted to give any desired tautness to the chains I. The cross-bar J can be omitted, if desired, and the ends of the chains I secured directly to the post K. The post F and joint C are strengthened against the draft of the chains I and the weight of the bracket by the rods N O, secured to each other at right angles. The forward end of the rod N is secured to the cap P, and the lower end of the rod O is secured to the pipe A by a band or clip, Q. The clip Q is provided with a toe, R, which engages with a recess in a collar, S, attached to the pipe A, to hold the rod O from turning. The pipe D is held from turning in the joint C by the clip T, secured to the rear end of the said pipe D, and provided with a toe, U, to engage with a recess in the joint C. With this construction, when the cross-bar G is adjusted to have equal arms, and the clip L and post K are moved outward on the pipe D to make the chains I taut, the pipe D will be held rigidly in place. By adjusting the cross-bar G and moving the clip L and post K inward to slacken the chains I, the burner E can be swung to either side a greater or less distance, according to the amount of slackness given to the said chains I.

By adjusting the cross-bar G to have unequal arms, the burner can be swung toward the longer arm of the said cross-bar a greater or less distance, as the slackness of the chains I will allow.

With this construction the bracket can be readily adjusted to allow the burner to have a greater or less swing in either direction, as the surroundings of the bracket may require, to guard against any of the said surroundings being set on fire by the flame of the burner.

Having thus described my invention, I claim as new and desire to secure by Letters Patent—

1. In a gas or lamp bracket, the combination, with the joint C, pipe D, and perforated cap P, secured upon the upper pivot of said joint to prevent its rotating thereon, of the adjustable cross-bar G, the post K, adjustably secured on the pipe D, and the chains I, connected to the said cross-bar and post, substantially as herein shown and described.

2. In a one-jointed gas or lamp bracket, the combination, with the joint C, the post F, the cap P, the rod O, the toe R, and pipe D, of the adjustable cross-bar G, the two chains I, and the cross-bar J, post K, and clip L M, substantially as herein shown and described, whereby the pipe D can be held rigid or allowed to have any desired amount of swing in either direction, as set forth.

HENRY PHILIP DREW.

Witnesses:
JAMES T. GRAHAM,
EDGAR TATE.